United States Patent [19]

Larom et al.

[11] Patent Number: 5,475,557
[45] Date of Patent: Dec. 12, 1995

[54] METHOD AND APPARATUS FOR PROTECTING ELECTRICAL SYSTEMS

[75] Inventors: Dov Larom, Herzelia Pituoch; Joseph Gross, Moshav Mazor; Zohar Avrahami, Rehuvot, all of Israel; Ram Shalvi, Kowloon, Hong Kong

[73] Assignee: Solar Wide Industrial Ltd., Hong Hong, Hong Kong

[21] Appl. No.: 761,763
[22] PCT Filed: Dec. 18, 1989
[86] PCT No.: PCT/GB89/01508
  § 371 Date: Jul. 30, 1991
  § 102(e) Date: Jul. 30, 1991
[87] PCT Pub. No.: WO90/07214
  PCT Pub. Date: Jun. 28, 1990

[30] Foreign Application Priority Data

Dec. 16, 1988 [IL] Israel ......................................... 088704

[51] Int. Cl.⁶ .................................................... H02H 3/32
[52] U.S. Cl. ................................................. 361/46; 361/50
[58] Field of Search ................................. 361/45, 46, 47, 361/48, 49, 50, 64, 66, 68

[56] References Cited

U.S. PATENT DOCUMENTS

| | | | |
|---|---|---|---|
| 2,363,895 | 11/1944 | Neher | 361/42 |
| 3,493,815 | 2/1970 | Hurtle | 361/66 |
| 3,614,534 | 10/1971 | Gross | 361/66 |
| 3,873,887 | 3/1975 | Barkan et al. | 361/66 |
| 4,285,022 | 8/1981 | Lewiner et al. | 361/45 |
| 4,618,907 | 10/1986 | Leopold | 361/45 |
| 4,791,520 | 12/1988 | Stegmüller | 361/63 |
| 4,862,142 | 8/1989 | Knight | 340/522 |

*Primary Examiner*—Howard L. Williams
*Assistant Examiner*—Ronald W. Leja
*Attorney, Agent, or Firm*—Ostrolenk, Faber, Gerb & Soffen

[57] ABSTRACT

Apparatus for providing an electrical system with protection against electrical shock in the event of a ground fault. The electrical system supplies power from a central mains inlet to at least one local electrical device. The central mains inlet includes a central ground fault detector and interrupter actuatable upon detection of a first predetermined level of current imbalance to interrupt the central mains inlet. A local ground fault detector is associated with the at least one local electrical device and is actuatable upon detecting a current imbalance of a second predetermined level which is lower than the first predetermined level. Controls are effective upon actuation of the local ground fault interrupter to actuate the central ground fault detector to cause it to interrupt the central mains inlet.

27 Claims, 4 Drawing Sheets

OVERALL SYSTEM

FIG. 1
OVERALL SYSTEM

FIG.3
LOCAL GROUND FAULT DETECTOR

FIG.5  BOOSTER MODULE — BU

METHOD AND APPARATUS FOR PROTECTING ELECTRICAL SYSTEMS

BACKGROUND OF THE INVENTION

The present invention relates to a method and apparatus for protecting an electrical system against electrical shock in the event of a ground fault, and also for continuously monitoring the electrical system to assure it is operating in a proper and safe manner.

Electrical shock results from closing a current carrying loop through the body. Usually, the loop consists of touching an electrical device which has a ground fault therein causing electrical current to flow through the body to ground. The electrical current flowing through the body causes physiological effects which, depending on the intensity and time duration of the current, can be extremely hazardous and even fatal. For example, currents below 0.5 mA, commonly called the "perception threshold", usually produce no sensation or damage; currents from about 0.5 mA to about 16 mA, commonly called the "let go threshold" generally produce a relatively weak electrical shock sufficient to produce sensation but insufficient to block the muscles so that the person receiving the shock may still "let go"; currents from 16 mA to about 50 mA may result in extreme pain, possible fainting, exhaustion injury, and paralysis of the muscles preventing the person from letting go; whereas currents of above 50 mA may expose the person to ventricular fibrillation and death.

When a person first contacts a "hot" device, the current at first is very low because of the contact impedance which is very high at the instant of "touch" due to the low pressure applied, the small contact area, and the high skin resistance. The current at this time may be below the perception threshold. However, as the pressure of contact with the "hot" device is increased, the contact area increases and the skin resistance decreases (the skin resistance being inversely proportional to the current), thereby increasing the current exponentially. The electrical shock sensation produced may cause the person to release himself from the device if he reacts fast enough before the current has reached the "let go" threshold. If not, his reaction may be blocked, preventing him from "letting go".

One method of providing an electrical system with protection against electrical shock in the event of a ground fault is to include a ground fault detector and interrupter in the central mains inlet which detects leakage current to ground and interrupts the electrical system supplied from the central mains inlet. However, since such interrupters are applied to the central mains inlet and therefore serve a large number of electrical devices, their sensitivity cannot be any better than the inherent leakage of the overall system including all the local electrical devices connected to the system. In addition, the starting currents for any of the electrical devices may be very high for short intervals, such that any slight imbalance in the system could actuate the interrupter. Also, transients during the starting of the device introduce high frequency components which also tend to actuate the interrupter. As a result, the presently used ground fault detectors and interrupters are usually characterized by relatively poor sensitivity and reliability and/or a high rate of false interruptions.

An object of the present invention is to provide apparatuses having advantages in the above respects for providing an electrical system with protection against electrical shock in the event of a ground fault, and also for continuously monitoring the electrical system to assure it is operating in a proper and safe manner.

BRIEF SUMMARY OF THE INVENTION

According to one aspect of the invention there is provided an apparatus for providing an electrical system with protection against electrical shock in the event of a ground fault, which electrical system supplies power from a central mains inlet to at least one local electrical device, and which central mains inlet includes a central ground fault detector and interrupter actuatable upon detection of a first predetermined level of current imbalance to interrupt the central mains inlet, the apparatus comprising, remote from said central ground fault detector, a local ground fault detector for the at least one local electrical device supplied from the central mains inlet and actuatable upon detecting, in its respective device, a current imbalance of a second predetermined level which is lower than said first predetermined level; and a control member effective upon actuation of said local ground fault detector, to actuate the central ground fault detector and to cause it to interrupt said central mains inlet, in which the local ground fault detector includes a local interrupter actuatable, upon detection of the second predetermined level of current imbalance, to interrupt the supply of current to the respective local electrical device, and each of said local ground fault deflectors and interrupters is included in a local safety system incorporated in a connector between the respective local electrical device and the electrical system.

For example, the connector could be the plug of the respective device, the socket for receiving the plug of the respective device, or an adaptor for receiving the plug of the respective device and for insertion into the socket of the respective device.

Each of the local ground fault detectors may be included in a local safety system which produces a visible indication, and also an audible alarm, upon its actuation. The visible indication may be produced first, e.g., to alert the user that the device has a ground leak either before the user actually touches the device, or after touching but in time to let go. The audible alarm may be actuated at the same time as the visible indicator, or preferably when a higher level of current imbalance is detected, to alert the person not to touch, or to let go if it is not too late, or at least to alert others in the area to come to the assistance of that person.

The actuation of the local ground fault detector may actuate the central ground fault detector by producing a level of current imbalance in the electrical system at least equal to the first predetermined level.

It will be seen that the above features of the present invention provide a number of advantages over the presently used central-type ground fault detector systems.

Thus, in this novel system the sensitivity of the central interrupter is independent of the inherent leakage of the overall system or any particular electrical device in the system, since the central interrupter will automatically and quickly be actuated whenever any one of the local ground fault detectors is actuated. The sensitivity of each local ground fault detector can thus be prefixed according to the characteristics of its respective local electrical device. The novel system thus permits high sensitivity and high reliability with a low rate of false interruptions.

In addition, the system, particularly when the local ground fault detector includes a visible indicator and/or an audible alarm, provides early warning to the person, hopefully sufficient to deter him from touching a "hot" device, or at least to enable him to let go of such a device and also to alert others in the vicinity in case the victim cannot let go. Further, while the local interrupter should not be set for a low rate of current imbalance, as may be caused by starting transients, etc., the visible and/or audible indicators could be set for such a low rate of current imbalance because they do not automatically interrupt the current supply but merely provide a signal to the user, which signal can be ignored under starting conditions.

Further, when one of the local ground fault detectors is actuated, either to provide a visible or audible indication or to interrupt the connection to the central mains inlet upon the detection of a fault in its respective local electrical device, this will indicate exactly where the fault appears, thereby facilitating the exact location of the fault and enabling immediate measures to be taken to correct it.

The apparatus of the present invention may be applied to existing systems already equipped with a ground fault detector and interrupter, in which case it is only necessary to provide each of the local electrical devices with a local safety system including its own ground fault detector and the necessary connections to boost the fault current to the central interrupter, or otherwise to actuate the central interrupter, upon the actuation of any one of the local ground fault detectors. Alternatively, the invention could be embodied in an overall comprehensive system also to include the central ground fault detector and interrupter actuated by any one of the local ground fault detectors. In either case, the local safety system including its local ground fault detector can be conveniently included in the connector (plug, socket or special adaptor) for the respective local electrical device.

It will also be appreciated that the invention could be included in existing systems, without central interrupters, to provide protection only with respect to individual local electrical devices, for example by incorporating the local safety system, including the visible and/or audible signals, with or without the local interrupter, in the connector for the local electrical device e.g. in the socket, plug or indicators could be set for such a low rate of current imbalance since they do not automatically interrupt the current supply but merely provide a signal to the user, which signal can be ignored under starting conditions.

Further, when one of the local ground fault detectors is actuated, either to provide a visible or audible indication or to interrupt the connection to the central mains inlet upon the detection of a fault in its respective local electrical device, this will indicate exactly where the fault appears, thereby facilitating the exact location of the fault and enabling immediate measures to be taken to correct it.

The method and apparatus of the present invention may be applied to existing systems already equipped with ground fault detector and interrupter, in which case it is only necessary to provide each of the local electrical devices with a local safety system including its own ground fault detector and the necessary connections to boost the fault current to the central interrupter, or otherwise to actuate the adaptor for the local electrical device.

Further features and advantages of the invention will be apparent from the description below.

BRIEF DESCRIPTION OF THE DRAWINGS

The invention is herein described by way of example only, with reference to the accompanying drawings, wherein.

DESCRIPTION OF A PREFERRED EMBODIMENT

Overall System of FIGS. 1, 1a, 1b, 1c

Figure 1:
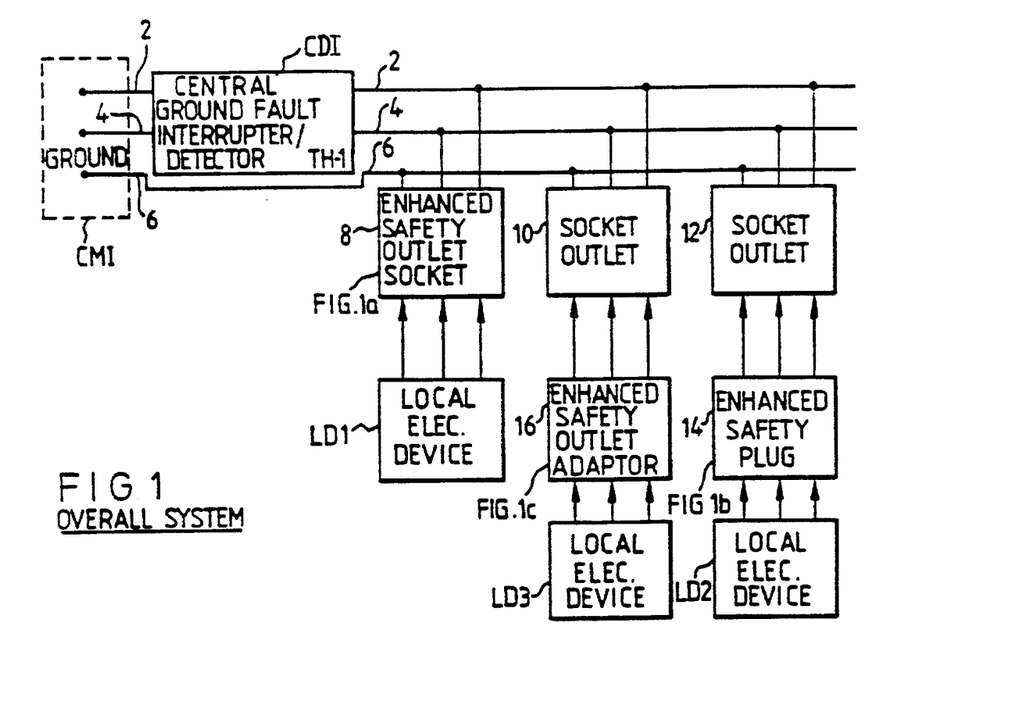
FIG. 1 is a block diagram of an overall system constructed in accordance with the present invention.

With reference first to FIG. 1, there is illustrated an overall electrical system provided with protection against electrical shock in the event of a ground fault anywhere in the system. The electrical system includes a central mains inlet CMI comprising two mains conductors 2, 4 and a ground conductor 6, supplying electrical power to a plurality of local electrical devices $LD_1$, $LD_2$, $LD_3$, etc., through a plurality of electrical sockets 8, 10, 12, one for each of the local electrical devices.

The illustrated system is protected against electrical shock in the event of a ground fault by a central detector/interrupter CDI including a central ground fault detector for detecting current imbalance and a central ground fault interrupter. When the central ground fault detector of CDI detects a predetermined level of current imbalance, the interrupter of CDI interrupts the connection of the electrical system to the central mains inlet CMI. The central ground fault detector of CDI may be of conventional construction, e.g., of the differential transformer type, which measures the current flowing through mains conductor 2 in one direction, and the current flowing through mains conductor 4 in the opposite direction. In the event of an imbalance between the two of a predetermined magnitude, the central ground fault detector/interrupter CDI actuates its interrupter to disconnect the electrical system from the central main inlet CMI. Because such central interrupters are well-known, further details of their construction and operation are not set forth herein.

As pointed out earlier, electrical systems protected only with a central detector/interrupter, corresponding to CDI in FIG. 1, are generally characterized by relatively low sensitivity or a high level of false interruptions since they are influenced by the complete electrical system downstream of the interrupter. Thus, if they are preset so as to be actuated at a relatively low level of current imbalance, there will be a relatively high rate of false interruptions; whereas if they are preset to be actuated at a relatively high level of current imbalance, they will be less sensitive to a fault in one of the local electrical devices.

The system illustrated in FIG. 1, as well as in the remaining figures of the drawings, permits a substantially higher degree of sensitivity and reliability, with a low rate of false interruptions. Briefly, this is accomplished by equipping each of the local electrical devices $LD_1$, $LD_2$, $LD_3$, etc., with a local safety system including a local ground fault detector preset according to the characteristics of its respective local electrical device, so as to be actuatable upon detecting a current imbalance of a predetermined level, which is lower than the level at which the central detector/interrupter CDI is actuated. Whenever one of the local ground fault detectors detects a current imbalance of a predetermined level in its respective electrical device, it actuates the central detector/interrupter CDI to cause it to interrupt the connection of the electrical system to the central mains inlet CMI.

In this manner the sensitivity of the overall system no longer depends on the predetermined level of imbalance detected by the central detector/interrupter CDI, but rather depends on the level of imbalance detected by each of the local ground fault detectors. The central detector/interrupter CDI may therefore be set at a relatively high level, hereinafter called a first predetermined level, of current imbalance, and each of the local ground fault detectors may be preset so as to be actuated at a lower predetermined level, hereinafter called a second predetermined level, of current imbalance, depending on the specific characteristics of its respective local electrical device.

Figures 1A, 1B:
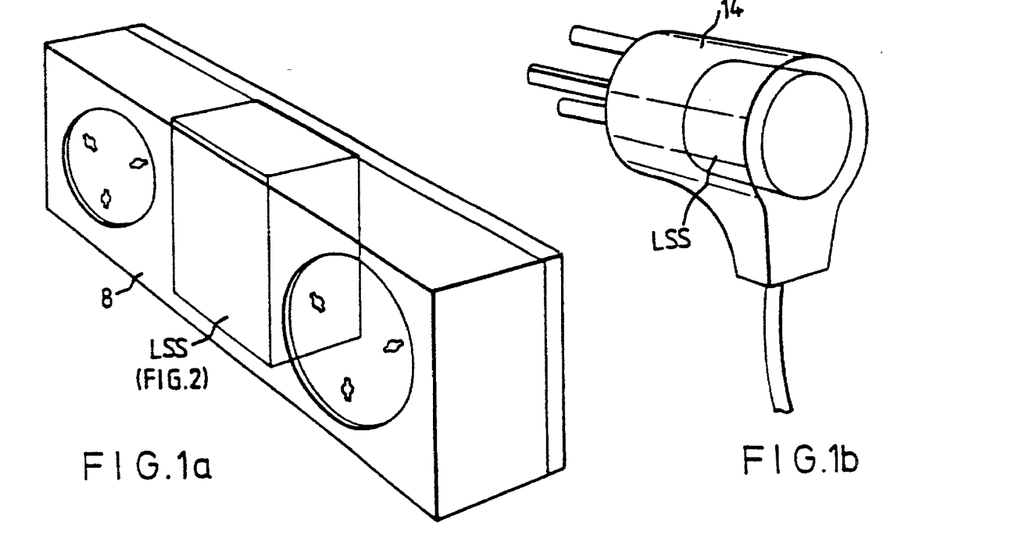
FIGS. 1a, 1b and 1c illustrate three forms of connectors which may be used to include the local ground safety system for each of the local electrical devices in the system of FIG. 1.

The local safety system, including its local ground fault detector, may be incorporated in socket 8 (FIG. 1) for the respective local electrical device $LD_1$, as illustrated by unit LSS in socket 8 in FIG. 1a. Alternatively, it may be incorporated in the plug 14 of the respective local electrical device $LD_2$, as indicated by unit LSS in plug 14 in FIG. 1b, or in a special adaptor as illustrated at 16 in FIG. 1c, including a plug 16a, connected to its respective electrical device $LD_3$ for insertion into the socket 10 (FIG. 1) for the respective electrical device.

Figure 2:
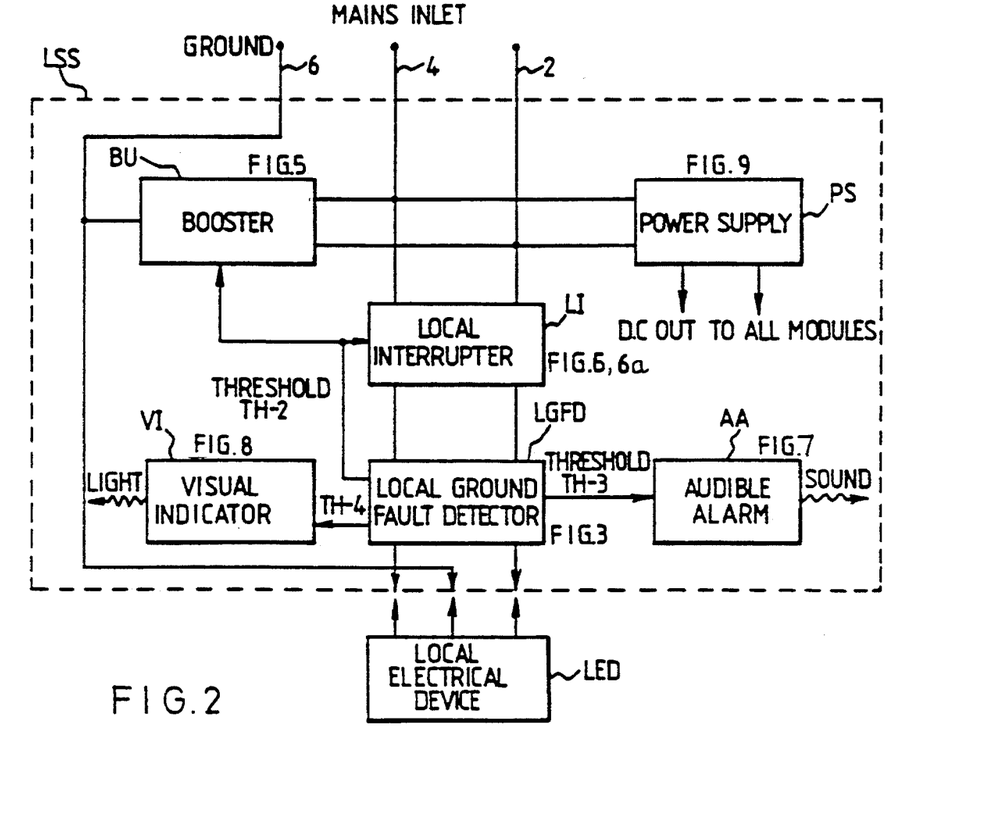
FIG. 2 is a block diagram illustrating one form of local safety system including its ground fault detector provided for each of the local electrical devices in the overall system of FIG. 1.

FIG. 2 illustrates one form of local safety system LSS which may be included in the connector to the respective local electrical device $LD_1$–$LD_3$ to actuate the central interrupter CDI upon detection of a current imbalance in the local electrical device. As noted above, each of the local safety systems LSS is adapted to detect a current imbalance of three different levels to perform different functions corresponding to the level of current imbalance detected, whereas the central detector/interrupter CDI is adapted to interrupt the central mains inlet CMI when it detects another level of current imbalance, which latter level is higher than the three levels detected by each of the local safety systems.

Thus, the highest level of current imbalance is indicated as threshold level $TH_1$ and as shown in FIG. 1, this level is detected by the central detector/interrupter CDI to interrupt the connection of the central mains inlet CMI to the electrical system supplying the power via conductors 2, 4 to the local electrical devices $LD_1$–$LD_3$, so that when this level of current imbalance is detected by the central detector/interrupter CDI, the complete electrical system supplied by the central mains inlet CMI is interrupted. In this respect, the central detector/interrupter CDI acts as a conventional central ground fault detector and interrupter presently used to protect electrical systems, except that the threshold level $TH_1$ for actuating the interrupter is preset at a substantially higher level than in the present conventional systems, to thereby reduce false interruptions without affecting sensitivity and reliability, since sensitivity and realibility are now determined by the local safety system LSS provided for each of the electrical devices $LD_1$–$LD_3$.

As illustrated in FIGS. 2, each of the local safety systems LSS includes a local ground fault detector LGFD capable of detecting three different levels of current imbalance, designated $TH_2$, $TH_3$ and $TH_4$ respectively in FIG. 2. Depending on the level of current imbalance detected, the local ground fault detector LGFD outputs control signals $TH_2$, $TH_3$ and $TH_4$ which are effective to perform the following functions:

Whenever the local ground fault detector LGFD for any one of the local electrical devices $LD_1$–$LD_3$ detects a current imbalance of the second-largest threshold level $TH_2$, it outputs a control signal to a booster unit BU which is effective to increase the current imbalance between the mains conductors 2, 4 connected to the central detector/interrupter CDI to the highest threshold level $TH_1$, thereby causing the central interruptor to interrupt the supply of electrical power via the central mains inlet CMI to all the local electrical devices $LD_1$–$LD_3$. In addition, control signal of threshold level $TH_2$ is also applied to a local interrupter LI also included in the local safety system unit LSS in the connector of the respective local electrical device $LD_1$–$LD_3$ to interrupt the supply of electrical current to that electrical device.

Whenever the local ground fault detector LGFD for the respective local electrical device detects a current imbalance of the lower level $TH_3$, it actuates an audible alarm unit AA to sound an alarm; and whenever it detects a current imbalance of the lowest level $TH_4$, it energizes a visual indicator unit VI, which provides a visual indication of that level of current imbalance.

The lowest threshold level signal $TH_4$ would be preset to indicate to the user that the respective local electrical device has excessive leakage current, so that the person can be alerted to this condition and take appropriate protective or corrective measures. The next highest threshold level signal $TH_3$ would be preset to actuate the audible alarm AA, not only to alert the person not to touch the "hot" device, or in time to cause him to let go if he has touched it, but in any event to alert those in the immediate vicinity of this condition in case the person can no longer let go. The next highest threshold level signal $TH_2$, would be preset to actuate the booster unit BU to cause that unit sharply to increase the level of current imbalance in the electrical system to the highest threshold level $TH_1$, so as to cause the central interrupter of CDI to immediately interrupt the current from the central mains inlet CMI. Threshold level signal $TH_2$ will also be effective to actuate the local interrupter LI to interrupt the current supply to the respective local electrical device.

It will thus be seen that a high level of sensitivity and reliability may be provided in the illustrated system, while at the same time minimizing false interruptions. Thus, the threshold level $TH_1$ of the central interrupter of CDI can be set relatively high so that the central interrupter is not actuated by starting or transient conditions in the system but only when one of the local circuit interrupters is actuated. The threshold levels of each local interrupter may be set according to the characteristics of the particular electrical device served by it. The threshold level of interruption of each local device should not be too low so that it would be actuated by starting or transient conditions, but the threshold level for actuating the visual and/or audible signals in the local safety system can be set quite low since their momentary actuation during starting or transient conditions would be recognized as such and could therefore be ignored.

Each local safety system LSS further includes a power supply unit PS which provides DC power to the various units in its respective local safety system.

Local Ground Fault Detector (FIGS. 3, 4, 4a, 4b)

Figure 3:
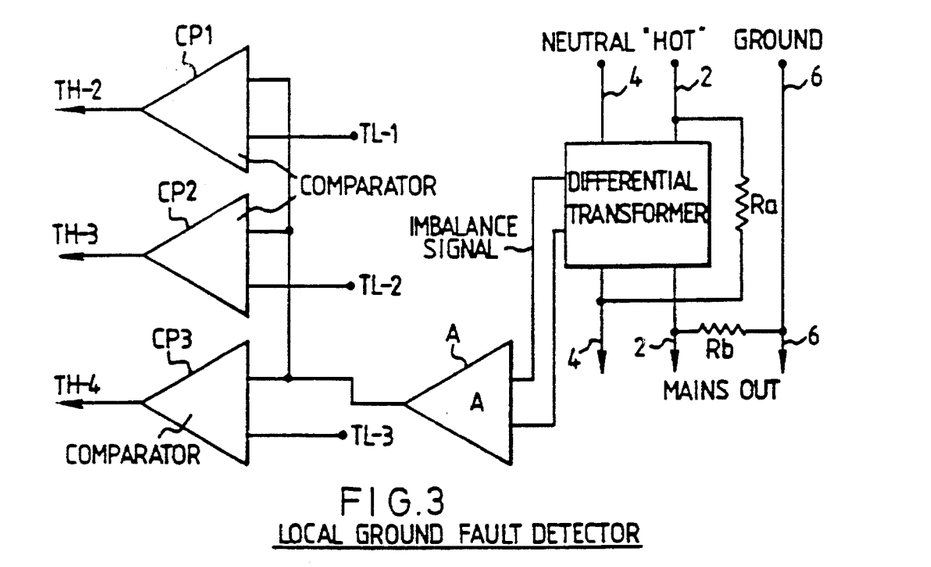
FIG. 3 is a block diagram illustrating the local ground fault detector unit in the local safety system of FIG. 2.

FIG. 3 illustrates one form of local ground fault detector LGFD which may used in the local safety system of FIG. 2. The detector includes a differential transformer DTR connected to the main conductors 2, 4, to sense any imbalance in the current through the two conductors and to produce an imbalance signal to an amplifier A. The latter amplifier outputs the imbalance signal to three comparators $CP_1$–$CP_3$ connected in parallel, each preset to output the three threshold control signals $TH_2$–$TH_4$ according to the level of current imbalance.

The control signals $TH_2$–$TH_4$ exercise the various controls as described above with respect to FIG. 2.

Figure 4:
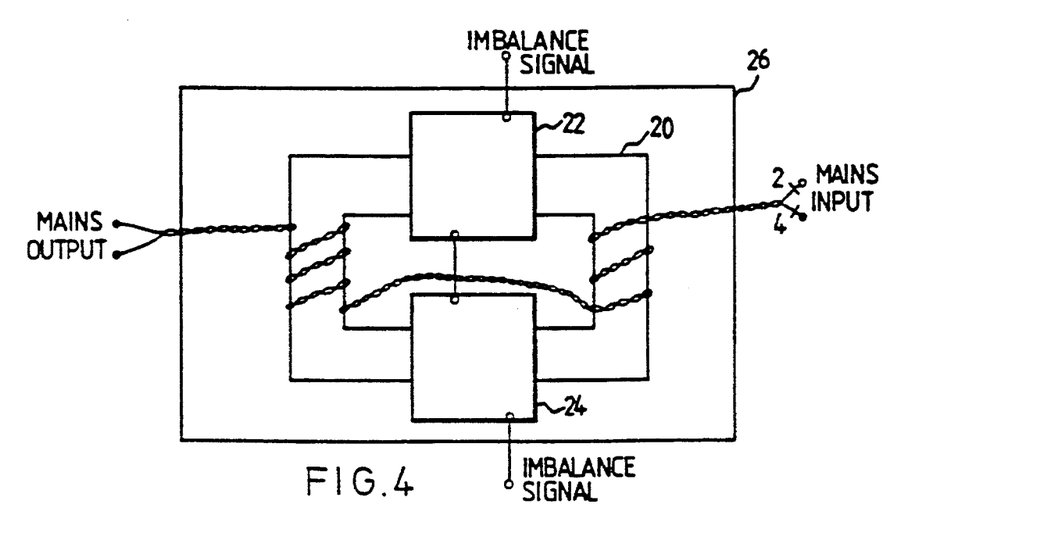
FIG. 4 illustrates the differential transformer in the local ground fault detector unit of FIG. 3.

One form of differential transformer DTR which may be used in the local ground fault detector LGFD of FIG. 3 is illustrated in FIG. 4. It includes a highly permeable core 20 having the mains conductors 2, 4, in the form of twisted wires, wound around two opposing end legs of the core. The two remaining legs of the core include two sensing coils 22, 24. The sensing coils are mounted symmetrically on the core 20 and generate a voltage output proportional to the magnetic flux in the core.

If the current is identical in both of the mains conductors 2, 4, no leakage to ground exists. Therefore, the generated magnetic flux in the core is zero, and no voltage is induced in the sensing coils 22, 24. However, in the event of leakage current, the flux in the core is not zero but rather is proportional to the leakage current, and therefore the output voltage generated by the sensing coils 22, 24 would be proportional to the leakage current, i.e., to the current imbalance between the two mains conductors 2, 4.

The two mains conductors 2, 4 are preferably twisted to ensure symmetry and thus balance of the transformer; and sensing coils 22, 24 are symmetrical to reduce response to stray flux. A magnetic shield 26 is preferably included to further reduce the response to stray flux.

Figure 4A:
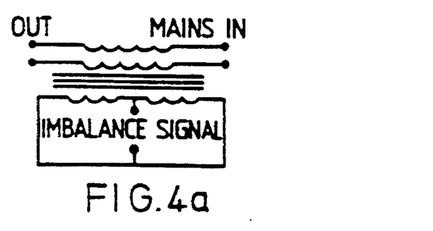
FIGS. 4a and 4b illustrate variations in the differential transformer unit of FIG. 4.
Figure 4B:
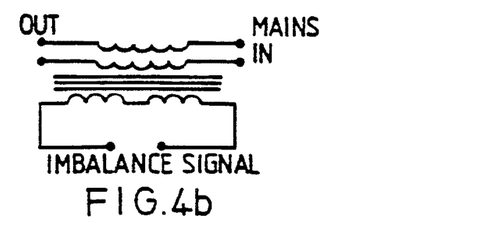

The two sensing coils 22, 24 may be connected together in a parallel configuration, as illustrated in FIG. 4a, or in a series configuration, as illustrated in FIG. 4b.

The local ground fault detector illustrated in FIG. 3 further includes resistors Ra and Rb to produce an imbalance in the current when the "hot" wire 2 and the "neutral" wire are reversed and/or when the ground 6 is disconnected. Thus, resistor Ra is connected between the hot wire 2 at the input end of the differential transformer DTR and the neutral wire 4 at the output end of the differential transformer; and resistor Rb is connected between the ground 6 and the hot wire 2 at the output end of the differential transformer. Both resistors have very high resistance so as to provide a very small current therethrough. Thus, if the hot wire 2 is properly connected to the hot terminal of the respective connector, and the ground 6 is also properly connected, a small leakage current will be produced through the two resistors Ra and Rb, which leakage currents will balance and therefore cancel each other, so that the differential transformer DTR will not output an Imbalance signal of the lowest threshold level $TH_4$. However, if the hot wire 2 is not properly connected, and/or the ground is disconnected, differential transformer DTR will output an imbalance signal at least of the threshold level $TH_4$ to thereby indicate this faulty condition.

Figure 5:
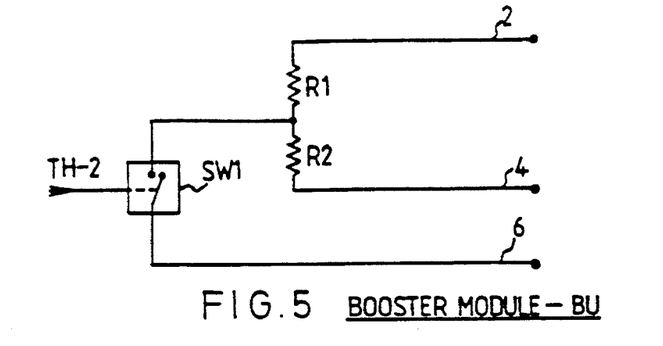
FIG. 5 is a block diagram illustrating the booster unit in the local safety system of FIG. 2.

Booster Unit BU (FIG. 5)

FIG. 5 illustrates an example of a booster unit BU in the local safety system LSS of FIG. 2. Such a unit includes an electrical shunt circuit comprising the two resistors $R_1$, $R_2$ supplied from the central mains conductors 2, 4, and an electrical switch $SW_1$ effective, upon receiving the threshold signal $TH_2$ from the local ground fault detector LGFD, to connect the shunt circuit to the ground circuit conductor 6 to thereby produce a large current imbalance, exceeding threshold level $TH_1$ (FIG. 1) sensed by the central detector of CDI. This large current imbalance immediately actuates the central interrupter CDI to interrupt the current from the central mains inlet CMI to the electrical system.

Figure 6:
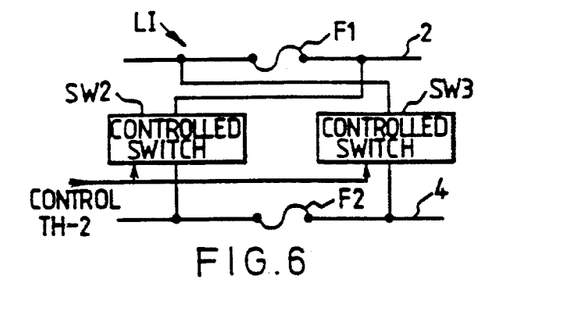
FIG. 6 is a block diagram illustrating the local interrupter unit in the local safety system of FIG. 2.
Figure 6A:
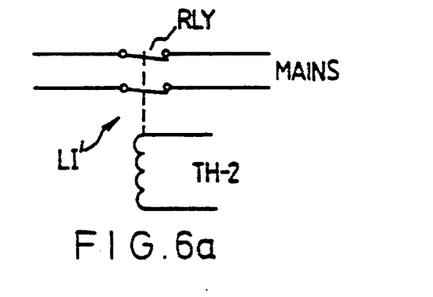
FIG. 6a illustrates a variation of the local interrupter unit in the local safety system of FIG. 2.

The Local Interrupter LI (FIGS. 6, 6a)

FIG. 6 illustrates an example of a local interrupter LI which may be used in the local safety system LSS of FIG. 2. The local interrupter LI is actuated by the same threshold control signal $TH_2$ as used for controlling the booster unit BU to actuate the central interrupter CDI upon detecting a current imbalance of threshold level $TH_2$. Thus, the current to the local electrical device is interrupted at the same time with the interruption of the current to the whole electrical system supplied by the central mains inlet CMI.

The example of the local interrupter LI illustrated in FIG. 6 includes two fast fuses $F_1$, $F_2$, each in one of the mains conductors 2, 4. These fuses are blown when the threshold control signal $TH_2$ from the local ground fault detector LGFD (FIG. 2) is applied to one or both electronic switches $SW_2$, $SW_3$, which short the mains conductors. The surge current of the switches should be sufficiently high to ensure blowing the fuses, $F_1$, $F_2$, which thereby interrupts the supply of electrical current to the respective local electrical device. The provision of two fast blowing fuses $F_1$, $F_2$, and two electronic switches $SW_2$, $SW_3$ ensures that the circuit will be interrupted when the "hot" wire is not determined. When the "hot" wire is determined, one fuse and one switch would be adequate.

FIG. 6a illustrates another local interrupter circuit, therein designated LI', which may be used. In this case, the control signal $TH_2$ is applied to a normally-closed fast-response latch-up relay or circuit-breaker RLY to interrupt the supply of current to the local electrical device.

Figure 7:
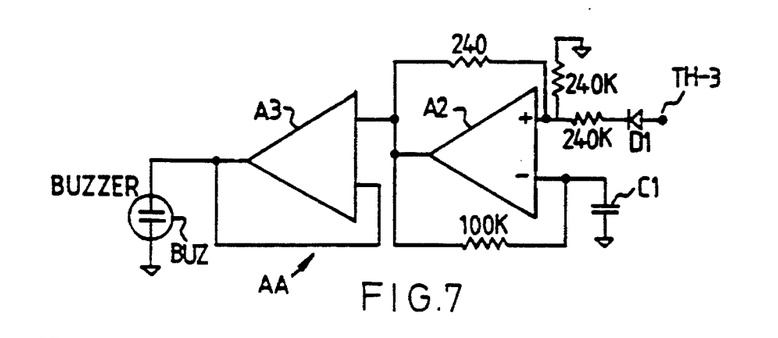
FIG. 7 is a block diagram illustrating the audible alarm unit in the local safety system of FIG. 2.

Audible Alarm AA (FIG. 7)

FIG. 7 illustrates the audible alarm AA of FIG. 2 which is actuated by the threshold signal $TH_3$ generated by the respective local ground fault detector LGFD. The threshold signal $TH_3$ is applied to a diode $D_1$ which controls an oscillator amplifier $A_2$ oscillating at an audio frequency. When the threshold signal $TH_3$ is too low, diode $D_1$ conducts, and imposes a low impedance and low voltage at the positive input of oscillator amplifier A2, thus preventing it from oscillating. However, when the threshold signal $TH_3$ is high, resulting from a high imbalance in the current supplied to the respective electrical device, diode $D_1$ is cut-off, whereupon amplifer $A_2$ oscillates at a frequency determined by R and C. The output of the oscillator is supplied to a buzzer BUZ, e.g. a piezo-electric device, via voltage follower amplifer $A_3$ which acts as a buffer. Actuation of the buzzer BUZ produces an audible alarm indicating that a current imbalance corresponding to threshold level $TH_3$ has been detected in the respective local electrical device.

Figure 8:
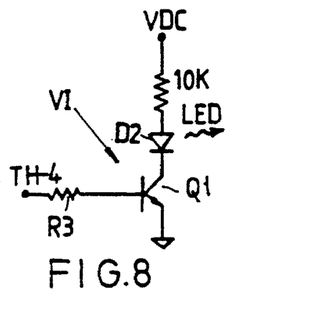
FIG. 8 is a block diagram illustrating the visual indicator unit in the local safety system of FIG. 2.

Visual Indicator VI (FIG. 8)

FIG. 8 illustrates a visual indicator VI which may be used in the local safety system LSS of FIG. 2 to indicate that the current imbalance, represented by the relatively low threshold level $TH_4$, has been detected. This would indicate a relatively low level of leakage in the respective electrical device insufficient to interrupt the system but sufficiently to alert the user to take protective or corrective measures. The visual indictor VI is controlled by the threshold signal $TH_4$ via a switching transistor $Q_1$ with a base resistor $R_3$. The visual indicator may be an LED (light-emitting diode) $D_2$ which is energized when the control threshold signal $TH_4$ is detected.

Figure 9:
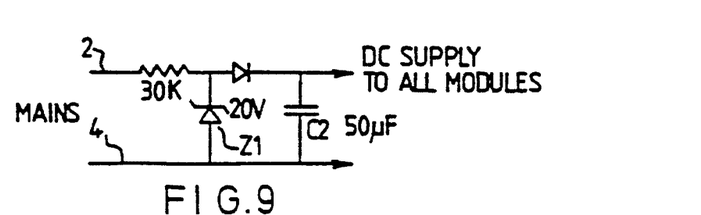
FIG. 9 is a block diagram illustrating the power supply unit in the local safety system of FIG. 2.

Power Supply PS (FIG. 9)

FIG. 9 illustrates the power supply unit PS in the local safety system LSS of FIG. 2. This unit includes resistor $R_3$, a rectifier diode $D_2$, for supplying DC to all the units in the respective local safety system illustrated in FIG. 2.

Overall Operation

The overall operation of the system illustrated in the drawings will be apparent from the above description. Thus, the system may be provided with the conventional central detector/interrupter CDI which is actuatable upon detecting a current imbalance in the mains conductors 2, 4 to interrupt the electrical system supplied by the central mains inlet CMI. In this case, however, the central detector/interrupter CDI is preset so as to be actuatable at a relatively higher current imbalance indicated as threshold level $TH_1$, than in the conventional systems, thereby minimizing false interruptions of the system, such as might be caused by starting or transient conditions.

Figure 1C:
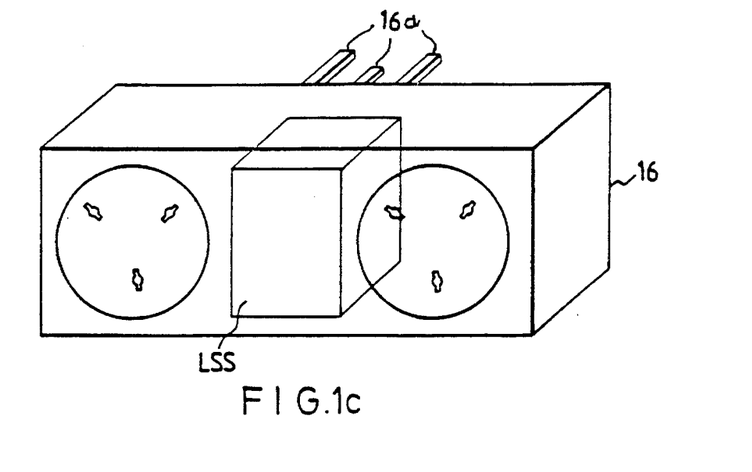

Each of the local electrical devices $LD_1$–$LD_3$ supplied by the central mains inlet CMI includes a local safety system LSS as illustrated in FIG. 2. Preferably, the local safety system is incorporated in the connector of each local electrical device, as illustrated for example in the socket for the device as shown in FIG. 1a, in the plug for the device as shown in FIG. 1b, or in a special adaptor for the device as shown in FIG. 1c. Each of the local safety systems LSS includes a local ground fault detector LGFD which measures the current imbalance, if any, in the respective electrical device, and outputs any one of three control signals $TH_2$–$TH_4$ corresponding to the level of current imbalance detected.

Thus, if a relatively low level of current imbalance is detected, it outputs control signal $TH_4$ which actuates the visual indicator VI. If a higher current imbalance is detected, it outputs control signal $TH_3$ which actuates the audible alarm AA; and if a still higher current imbalance is detected, it outputs control signal $TH_2$ which actuates the booster unit BU and also the local interrupter LI.

When the visual indicator VI is energized, this merely provides a visual indication of a potentially dangerous condition such as high leakage, so that the user can take appropriate protective measures if touching the equipment, or corrective measures to correct the condition. The larger level of current imbalance represented by control signal $TH_3$, sounds the audible alarm that there is a dangerous condition, to warn the user not to touch the equipment, or to "let go" if he can still do so after touching the equipment; this alarm also alerts those in the area in case the user needs assistance. Control signal $TH_2$, which is outputted when the current imbalance now shows an extremely dangerous condition, automatically actuates booster unit BU to sharply increase the current imbalance in the overall system to the level $TH_1$ in order to immediately actuate the central interrupter of CDI, and thereby to disconnect the complete system from the central mains inlet CMI. At the same time, the local interrupter LI is actuated by control signal $TH_2$ to disconnect the respective local electrical device.

It will thus be seen that the described system provides the electrical system with a high degree of sensitivity and reliability against electrical shock in the event of a ground fault, without increasing the rate of false interruptions that would normally be present when the sensitivity of a conventional system is increased. Both the visual indicator VI and the audible indicator AA may be of the non-latching type, so that the signals provided by them when sensing current imbalances of threshold levels $TH_3$ or $TH_4$ will continue only for the duration of the respective current imbalance; thus, if the current imbalance is caused by a starting or transient condition, the user will be altered to this, but the condition will not actuate either the local circuit interrupter or the central circuit interrupter. Accordingly, these threshold levels can be set relatively low as they will not result in a false interruption of the local electrical device or the central system. Alternatively, the visual and audible indicators may be of the self-latching types, so that once actuated they remain actuated, thereby enabling any fault in the system to be easily traced.

It will be appreciated that certain features of the invention could be used without others. For example, a system could be provided only for protecting local electrical devices, e.g. by providing the above-described local safety system in individual local electrical devices, as by including the local safety system in the connector for the respective local electrical device.

When making an extension to a mains circuit, a local safety system (LSS) may be installed at the junction between the mains circuit and the extension, for example in a socket (FIG. 1a), and subsequent sockets may be wired to the "output" side of the socket so that any fault occurring in devices connected to the subsequent sockets will activate the local safety system.

Test and reset circuits may be provided for testing the main threshold level TH2. The construction and operation of such circuits is well known in the art. Very preferably a sense circuit is also provided, to enable the user to check that the lower threshold level(s), TH3 or TH4, is (are) working, the audible or visible alarm being activated on testing with the sense circuit.

In a particularly preferred embodiment, the main threshold level TH2 is set at about 7 mAmp, and the (or a) lower threshold level is set at about 3.5 mAmp, the sense circuit being arranged to simulate a leakage current just above the lower threshold level. Both the visual indicator and the audible alarm may be arranged to be activated at a common lower threshold level, say 3.5 mAmp. This may have particular advantage for people with sight or hearing impairment.

Many other variations, modifications and applications of the invention will be apparent.

What is claimed is:

1. An apparatus for providing protection against electrical shock caused by an electrical system, the electrical system supplying power from a central mains inlet to at least one of a plurality of local electrical devices via a plurality of mains conductors, the central mains inlet being connected to a central ground fault detector and a central ground fault interrupter, the central ground fault detector detecting current imbalance between the plurality of mains conductors, the central ground fault interrupter being actuated when said central ground fault detector detects a first predetermined level of current imbalance to interrupt the central mains inlet, the apparatus comprising:

a) a plurality of local safety systems each being connected to one of said plurality of local electrical devices and the central mains inlet, each of said local safety systems including:
    1) a local ground fault detector for detecting in said one local electrical device a current imbalance of a second predetermined level which is lower than the first predetermined level; and
    2) a local circuit interrupter for interrupting said one local electrical device when the local ground fault detector detects said second predetermined level of current imbalance;
  b) control means for actuating the central ground fault interrupter to interrupt said central mains inlet when one of said local ground fault detectors detects said second predetermined level of current imbalance in one of said plurality of local electrical devices; wherein
  each said local safety system includes at least one of means for producing a visible indication and means for producing an audible alarm, upon detection of a third level of imbalance, lower than both said first and second levels.

2. The apparatus according to claim 1, further comprising a plurality of connectors, each connector connecting one of said plurality of local electrical devices to the electrical system, wherein each connector has one of said local safety systems provided therein and each of said connectors comprises a supply plug for a respective one of said plurality of local electrical devices.

3. The apparatus according to claim 1, further comprising a plurality of connectors, each connector connecting one of said plurality of local electrical devices to the electrical system, wherein each connector has one of said local safety systems provided therein and each of said connectors comprises a socket for receiving a plug of a respective local electrical device.

4. The apparatus according to claim 1, further comprising a plurality of connectors, each connector connecting one of said plurality of local electrical devices to the electrical system, wherein each connector has one of said local safety systems provided therein and each of said connectors comprises an adaptor for receiving the plug of a respective local electrical device and for insertion into a socket for a respective local electrical device.

5. The apparatus according to claim 1, wherein each local safety system includes means for producing a visible indication upon detection of a current imbalance.

6. The apparatus according to claim 1, wherein each local safety system includes means for producing an audible alarm upon detection of current imbalance.

7. The apparatus according to claim 1, wherein each of said local circuit interrupters includes a switch connected across the mains conductors and actuatable to short circuit the mains conductors upon detection of said second predetermined level of current imbalance in a respective local electrical device; and a fast-fuse connected to each of the mains conductors and adapted to be blown to open the connection of the central mains inlet to a respective local electrical device upon actuation of said switch.

8. The apparatus according to claim 1, wherein each of said local ground fault detectors includes a ground, a hot wire and a neutral wire, the hot and neutral wires being arranged in a predetermined order, each of said local ground fault detectors including a current imbalance signal generator for generating a current imbalance signal when the hot and neutral wires are reversed and/or when the ground is disconnected.

9. An apparatus according to claim 1, wherein each local ground fault detector comprises a differential transformer having a highly permeable core, opposing end limbs and opposing intermediate limbs, said plurality of mains conductors being wound around each of said opposing end limbs and each of said opposing intermediate limbs having sensing coils thereon to generate a voltage proportional to the magnetic flux in the core.

10. An apparatus according to claim 9, wherein the mains conductors are twisted together around each other at a location where the mains conductors surround the opposing end limbs of the core.

11. The apparatus according to claim 1, wherein said means for producing a visible indication and said means for producing an audible alarm are activated by said control means at substantially the same predetermined level of current imbalance.

12. The apparatus according to claim 1, wherein each said ground fault detector includes sensing means operable by a user of the system to cause the third level of imbalance to be exceeded, thereby to confirm that said visible indication and/or audible alarm is operable.

13. The apparatus according to claim 1, wherein at least one power outlet socket is provided downstream of each of said local ground fault detectors at a location remote therefrom, whereby a fault at said at least one outlet socket will be detected by respective local ground fault detector as a current imbalance so that a respective local circuit interrupter interrupts a respective local electrical device.

14. The apparatus according to claim 1, wherein said control means comprises a booster circuit including an electrical switch being effective upon actuation of a local circuit interrupter to connect a shunt to a ground circuit conductor to produce an imbalance in said electrical system greater than said first predetermined level thereby to actuate the central ground fault interrupter to interrupt said central mains inlet.

15. An electrical system, comprising:
  a) a central mains inlet;
  b) a plurality of mains conductors;
  c) a central ground fault detector/interrupter connected to the central mains inlet via the plurality of mains conductors, the central ground fault detector/interrupter including:
    1) a central ground fault detector for detecting current imbalance between the mains conductors;
    2) a central ground fault interrupter being actuatable when said central ground fault detector detects a first predetermined level of current imbalance to interrupt the central mains inlet;
  d) a plurality of local electrical devices connected to each of said mains conductors;
  e) a plurality of local safety systems each being connected to one of the plurality of local electrical devices and the mains conductors, each of said local safety systems including:

1) a local ground fault detector for detecting in a respective local electrical device a current imbalance of a second predetermined level which is lower than said first predetermined level, wherein each local safety system includes means for producing an audible alarm when the local ground fault detector has detected a third predetermined level of current imbalance lower than the first level, and means for producing a visible indication upon detection of a fourth predetermined level of current imbalance lower than the third level; and 2) a local circuit interrupter for interrupting power supplied from the central mains inlet to a respective local electrical device when the local ground fault detector detects the second predetermined level of current imbalance;

f) control means for actuating the central ground fault interrupter to interrupt the central mains inlet when one of the local ground fault detectors detects the second predetermined level of current imbalance in one of the plurality of local electrical devices.

16. The electrical system of claim 15, further comprising a plurality of connectors, each connector connecting one of the plurality of local electrical devices and the central mains inlet, wherein each of the connectors has one of said local safety systems provided therein.

17. The electrical system of claim 16, wherein each of the connectors comprises one of a socket for receiving a plug of a respective local electrical device, an adaptor for receiving a plug of a respective local electrical device and for insertion into a socket for a respective local electrical device, and a supply plug for a respective local electrical device.

18. The electrical system of claim 15, wherein each of the local circuit interrupters includes a switch connected across the mains conductors and actuatable to short circuit the mains conductors upon detection of the second predetermined level of current imbalance in a respective local electrical device, and a fast-fuse connected to each of the mains conductors and adapted to be blown to open the connection between the central mains inlet and a respective local electrical device upon actuation of said switch.

19. The electrical system of claim 15, wherein each of the local ground fault detectors includes a ground, a hot wire and a neutral wire, the hot and neutral wires being arranged in a predetermined order, each of said local ground fault detectors including a current imbalance signal generator for generating a current imbalance signal when the hot and neutral wires are reversed from said predetermined order and/or when the ground is disconnected.

20. The electrical system of claim 15, wherein each local ground fault detector comprises a differential transformer having a highly permeable core, opposing end limbs and opposing intermediate limbs, said plurality of mains conductors being wound around each of the opposing end limbs, each of the opposing intermediate limbs having sensing coils thereon to generate a voltage proportional to the magnetic flux in the core.

21. The electrical system of claim 20, wherein the mains conductors are twisted together around each other in a location where the mains conductors surround the opposing end limbs of the core.

22. The electrical system of claim 15, wherein said means for producing an audible alarm and said means for producing a visible indication are activated by the control means at substantially the same predetermined level of current imbalance.

23. The electrical system of claim 15, wherein each of the local safety systems includes sensing means operable by a user to cause the third level of imbalance to be exceeded, whereby to confirm that at least one of the means for producing a visible indication and the means for producing an audible alarm is operable.

24. The electrical system of claim 15, wherein at least one power outlet socket is provided downstream of each of the local ground fault detectors at locations remote therefrom, whereby a fault at the at least one outlet socket is detected by a respective local ground fault detector.

25. The electrical system of claim 15, wherein said control means comprises a booster circuit including an electrical switch for connecting a shunt to a ground circuit conductor to produce a current imbalance in said electrical system greater than said first predetermined level of current imbalance to actuate the central ground fault interrupter to interrupt said central mains inlet when said local circuit interrupter is actuated.

26. An apparatus for providing protection against electrical shock caused by an electrical system, the electrical system supplying power from a central mains inlet to at least one of a plurality of local electrical devices via a plurality of mains conductors, the central mains inlet being connected to a central ground fault detector and a central ground fault interrupter, the central ground fault detector detecting current imbalance between the plurality of mains conductors, the central ground fault interrupter being actuated when said central ground fault detector detects a first predetermined level of current imbalance to interrupt the central mains inlet, the apparatus comprising:

a) a plurality of local safety systems each being connected to one of said plurality of local electrical devices and the central mains inlet, each of said local safety systems including:

1) a local ground fault detector for detecting in said one local electrical device a current imbalance of a second predetermined level which is lower than the first predetermined level; and 2) a local circuit interrupter for interrupting said one local electrical device when the local ground fault detector detects said second predetermined level of current imbalance;

b) means for creating an increased current imbalance between the mains conductors that is equal to or greater than said first predetermined level in response to one of said local circuit interrupters interrupting a respective local electric device, wherein the central ground fault detector detects the increased current imbalance and causes the central ground fault interrupter to interrupt said central mains inlet.

27. An apparatus for providing protection against electrical shock caused by an electrical system, the electrical system supplying power from a central mains inlet to at least one of a plurality of local electrical devices via a plurality of mains conductors, the central mains inlet being connected to a central ground fault detector and a central ground fault interrupter, the central ground fault detector detecting current imbalance between the plurality of mains conductors, the central ground fault interrupter being actuated when said central ground fault detector detects a first predetermined level of current imbalance to interrupt the central mains inlet, the apparatus comprising:

a) a plurality of local safety systems each being connected to one of said plurality of local electrical devices and the central mains inlet, each of said local safety systems including:

1) a local ground fault detector for detecting in said one local electrical device a current imbalance of a second predetermined level which is lower than the first predetermined level and for outputting a control signal;

2) a local circuit interrupter for interrupting said one local electrical device when the local ground fault detector detects said second predetermined level of current imbalance; and 3) a booster unit for receiving said control signal and in response thereto, increasing the current imbalance between the mains conductors to be equal to or greater than said first predetermined level thereby actuating the central ground fault interrupter to interrupt said central mains inlet.

* * * * *